United States Patent
Sullivan et al.

(10) Patent No.: US 9,427,628 B2
(45) Date of Patent: *Aug. 30, 2016

(54) BLENDS OF LINEAR AND BRANCHED NEODYMIUM-CATALYZED RUBBER FORMULATIONS FOR USE IN GOLF BALLS

(71) Applicant: Acushnet Company, Fairhaven, MA (US)

(72) Inventors: Michael J. Sullivan, Old Lyme, CT (US); David A. Bulpett, Boston, MA (US); Brian Comeau, Berkley, MA (US); Derek A. Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,152

(22) Filed: Oct. 24, 2014

(65) Prior Publication Data

US 2015/0051016 A1 Feb. 19, 2015

Related U.S. Application Data

(63) Continuation-in-part of application No. 14/084,274, filed on Nov. 19, 2013, now Pat. No. 9,205,307, which is a continuation of application No. 12/910,914, filed on Oct. 25, 2010, now Pat. No. 8,586,678.

(51) Int. Cl.
| | |
|---|---|
| *A63B 37/00* | (2006.01) |
| *A63B 37/02* | (2006.01) |
| *C08L 9/00* | (2006.01) |

(52) U.S. Cl.
CPC ......... *A63B 37/0039* (2013.01); *A63B 37/005* (2013.01); *A63B 37/0024* (2013.01); *A63B 37/0027* (2013.01); *A63B 37/0051* (2013.01); *A63B 37/0074* (2013.01); *A63B 37/0075* (2013.01); *A63B 37/0076* (2013.01); *C08L 9/00* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,683,257 A | 7/1987 | Kakiuchi et al. | 524/432 |
| 4,929,678 A | 5/1990 | Hamada et al. | 525/193 |
| 4,931,376 A | 6/1990 | Ikematsu et al. | 526/164 |
| 4,955,613 A | 9/1990 | Gendreau et al. | 273/218 |
| 4,974,852 A | 12/1990 | Hiraoka et al. | 273/218 |
| 4,984,803 A | 1/1991 | Llort et al. | 273/235 R |
| 5,082,285 A | 1/1992 | Hamada et al. | 273/218 |
| 5,484,870 A | 1/1996 | Wu | 528/28 |
| 5,688,191 A | 11/1997 | Cavallaro et al. | 473/373 |
| 5,849,168 A | 12/1998 | Lutz | 264/755 |
| 5,905,125 A | 5/1999 | Tsujimoto et al. | 526/144 |
| 6,139,447 A | 10/2000 | Ohama | 473/378 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,277,920 B1 | 8/2001 | Nesbitt | 525/274 |
| 6,315,684 B1 | 11/2001 | Binette et al. | 473/377 |
| 6,394,915 B1 | 5/2002 | Nesbitt | 473/378 |
| 6,503,156 B1 | 1/2003 | Sullivan | 473/374 |
| 6,506,130 B2 | 1/2003 | Sullivan | 473/374 |
| 6,695,718 B2 | 2/2004 | Nesbitt | 473/374 |
| 6,774,187 B2 | 8/2004 | Voorheis et al. | 525/193 |
| 6,835,794 B2 | 12/2004 | Wu et al. | 528/64 |
| 7,066,837 B2 | 6/2006 | Jordan | 473/374 |
| 8,586,678 B2 * | 11/2013 | Sullivan | A63B 37/0051 473/371 |
| 2001/0018375 A1 | 8/2001 | Hayashi et al. | 473/371 |
| 2001/0019971 A1 | 9/2001 | Hayashi et al. | 473/371 |
| 2003/0100386 A1 | 5/2003 | Jordan | 473/374 |
| 2003/0199337 A1 | 10/2003 | Hebert et al. | 473/371 |
| 2006/0014595 A1 * | 1/2006 | Higuchi | A63B 37/0003 473/371 |
| 2006/0047080 A1 | 3/2006 | Higuchi et al. | 525/261 |
| 2011/0288193 A1 * | 11/2011 | Kloppenburg | C08K 3/0033 521/150 |
| 2014/0080636 A1 * | 3/2014 | Sullivan | A63B 37/0051 473/374 |

FOREIGN PATENT DOCUMENTS

| | | | |
|---|---|---|---|
| JP | 62121742 | | 6/1987 |
| JP | 09151277 | | 6/1997 |
| JP | 2004180733 | | 7/2004 |
| JP | 2006241265 | * | 9/2006 |

OTHER PUBLICATIONS

Lanxess Easy Processing NdBR (2007).*
Non-Final Office Action dated Feb. 22, 2013 of corresponding U.S. Appl. No. 12/910,914.
Notice of Allowance dated Jul. 24, 2013 of corresponding U.S. Appl. No. 12/910,914.
Japanese Office Action dated Dec. 6, 2012 of corresponding Japanese Patent Application No. 2011-230398.

* cited by examiner

*Primary Examiner* — David Buttner
(74) *Attorney, Agent, or Firm* — Smith, Gambrell & Russell, LLP

(57) ABSTRACT

The invention relates to golf ball formulations formed from blends of linear and branched polybutadienes catalyzed with neodymium that have improved properties and processing characteristics. Golf ball components may be formed from the blends to provide high coefficient of restitution.

20 Claims, 2 Drawing Sheets

BLENDS OF LINEAR AND BRANCHED NEODYMIUM-CATALYZED RUBBER FORMULATIONS FOR USE IN GOLF BALLS

CROSS-REFERENCE TO RELATED APPLICATIONS

This application is a continuation-in-part of U.S. patent application Ser. No. 14/084,274, filed Nov. 19, 2013, now U.S. Pat. No. 9,205,307, which is a continuation of U.S. patent application Ser. No. 12/910,914, filed Oct. 25, 2010, now U.S. Pat. No. 8,586,678, the entire disclosures of which are incorporated by reference herein.

FIELD OF THE INVENTION

The present invention relates to rubber compositions for use in golf balls, more particularly to compositions that include blends of polybutadiene rubbers having improved properties and processing characteristics.

BACKGROUND OF THE INVENTION

Conventional golf balls, solid or wound, typically have at least one core layer and at least one cover layer. Two-piece balls having a solid construction are popular with golfers because they provide a very durable ball with high initial velocity resulting in longer flight distance. Due to the rigidity of the materials used, however, the balls have a "hard" feel when struck with a club and a relatively low spin rate that makes them difficult to control, particularly on shorter approach shots.

Wound balls, i.e., spherical solid rubber or liquid center with a tensioned elastomeric thread wound thereon, are preferred by some golfers for a softer feel and higher spin enabling better control in and around the green. Wound balls typically travel a shorter distance, however, when struck as compared to a two piece ball. Moreover, as a result of their more complex structure, wound balls generally require a longer time to manufacture and are more expensive to produce than a conventional two piece ball.

Solid cores, used in wound or solid golf balls, are generally formed of a polybutadiene composition. In addition to one-piece cores, solid cores can also contain a number of outer layers, such as in a dual core golf ball. Covers, for solid or wound balls, are generally formed of ionomer resins, balata, polyurea, or polyurethane, and can consist of a single layer or include one or more layers, e.g., a dual cover with an inner and outer cover layer, and optionally at least one intermediate layer disposed about the core.

The core of solid golf balls is the "engine" of the ball, providing the velocity required for good distance. However, a core that is too hard can result in a golf ball that provides poor feel. Manufacturers are constantly experimenting with various core compositions and constructions in an effort to optimize both feel and distance. Most conventional solid cores comprise polybutadiene rubber or some modified form thereof, which provides the primary source of resiliency for the golf ball.

Polybutadiene rubber core compositions still have room for improvement in resilience, which is determined by coefficient of restitution ("COR"). As would be appreciated by those skilled in the art of golf ball manufacturing, the COR along with angle of trajectory (i.e., launch angle) and club head speed determine the distance a golf ball will travel when hit by a golf club. One way to measure the COR is to propel a ball at a given speed against a hard massive surface and measure its incoming and outgoing velocity. The COR is the ratio of the outgoing velocity to the incoming velocity and is expressed as a decimal between zero and one. There is no United States Golf Association limit on the COR of a golf ball, but the initial velocity of the golf ball cannot exceed 250+/−5 feet/second. As a result, the industry goal for initial velocity is 255 feet/second, and the industry strives to maximize the COR without violating this limit.

In general, polybutadiene rubbers of high molecular weight (high Mooney viscosity) have better resilience than polybutadiene rubbers of low molecular weight (low Mooney viscosity). However, as the molecular weight increases, the milling and processing properties of the polybutadiene rubber deteriorate. Polybutadiene rubber catalyzed with lanthanide series elements, such as neodymium, tends to be linear and narrow in polydispersity (closer to 1.0). The linearity and narrow polydispersity allows high-molecular weight neodymium-catalyzed polybutadiene rubber ("Nd-BR") to provide improved resilience, but causes problems in extrusion processes and storage difficulties such as cold flow. In comparison to Nd-BR, polybutadiene rubber catalyzed with cobalt and/or nickel ("Co-BR, Ni-BR") is typically more branched and has wider polydispersity (distant from 1.0). However, while the branching characteristic facilitates processing, the wide polydispersity and branching generally gives low resilience.

Attempts to improve golf ball COR by using various blends of polybutadiene rubber in core compositions include, among others, U.S. Pat. Nos. 4,683,257; 4,931,376; 4,955,613; 4,984,803; 5,082,285; 6,139,447; 6,277,920; 6,315,684; and 6,774,187.

While advances have been made, there remains a need in the golf ball manufacturing art to provide compositions with improved properties and processability that are useful in golf ball components and, more specifically, golf ball core components. Advantageously, the compositions of the present invention provide enhanced processing characteristics without sacrificing resilience in the resulting golf balls.

SUMMARY OF THE INVENTION

The present invention is directed to a golf ball including a core and a cover, wherein the core is formed from a blend including: a linear polybutadiene formed with a neodymium catalyst having a first Mooney viscosity of from about 30 to about 100; and a branched polybutadiene formed with a neodymium catalyst having a second Mooney viscosity of from about 20 to about 90, wherein the second Mooney viscosity is less than the first Mooney viscosity. In one embodiment, the second Mooney viscosity is about 30 to about 75. In one embodiment, the linear polybutadiene has a higher Mooney Stress Relaxation than the branched polybutadiene. In another embodiment, the blend may further include a cobalt-, lithium-, titanium-, or nickel-catalyzed polybutadiene, or a combination thereof.

In this aspect of the invention, the branched polybutadiene may have a Mooney viscosity of from about 30 to about 75. In one embodiment, the second Mooney viscosity is about 35 to about 50. For example, the second Mooney Viscosity may range from about 40 to about 45. In addition, the branched polybutadiene may have a solution viscosity to Mooney Viscosity ratio of about 4 or less and the linear polybutadiene may have a solution viscosity to Mooney Viscosity ratio of greater than about 5. In one embodiment, the solution viscosity to Mooney Viscosity ratio of the linear polybutadiene is at least about 2 times greater than the solution viscosity to Mooney Viscosity ratio of the branched polybutadiene. In one embodiment, the solution viscosity to Mooney Viscosity ratio is from 2 to about 4. For example, the solution viscosity to Mooney Viscosity ratio may range from about 3.6 to about 3.75. In another embodiment, the linear polybutadiene has a first polydispersity and the branched polybutadiene has a second polydispersity greater than the first polydispersity.

The golf ball may also include one or more layers disposed between the core and the cover. For example, in one embodiment, the ball includes an intermediate layer disposed between the cover and the core.

The present invention also relates to a golf ball including a core and a cover wherein a portion of the golf ball is formed from a blend including: a linear polybutadiene formed with a neodymium catalyst having a first polydispersity; and a branched polybutadiene formed with a neodymium catalyst having a second polydispersity greater than the first polydispersity, wherein the second polydispersity is greater than about 2.

The present invention also relates to a golf ball including a core, a cover, and an intermediate layer disposed between the cover and the core, wherein a portion of the golf ball is formed from a blend including: a linear polybutadiene formed with a neodymium catalyst having a first polydispersity and a first Mooney viscosity; and a branched polybutadiene formed with a neodymium catalyst having a second polydispersity greater than the first polydispersity and a second Mooney viscosity less than the first Mooney viscosity, wherein the second polydispersity is greater than about 2, and wherein the second Mooney viscosity is of from about 35 to about 50.

In one embodiment, the linear polybutadiene has a first Mooney Stress Relaxation and the branched polybutadiene has a second Mooney Stress Relaxation, and wherein the second Mooney Stress Relaxation is less than the first Mooney Stress Relaxation. In another embodiment, the first polydispersity is less than about 3. In yet another embodiment, the linear polybutadiene has a solution viscosity to Mooney Viscosity ratio that is at least 2 times greater than the solution viscosity to Mooney Viscosity ratio of the branched polybutadiene. In still another embodiment, the first Mooney viscosity is from about 30 to about 100. In still another embodiment, the core includes a center and at least one outer core layer, and wherein at least one of the center or the outer core includes the blend. In another embodiment, the cover includes polyurethane, polyurea, or a combination thereof.

The present invention is also directed to a golf ball including a core and a cover, wherein the core includes a blend including: a linear polybutadiene formed with a neodymium catalyst having a first polydispersity and a first solution viscosity to Mooney Viscosity ratio; and a branched polybutadiene formed with a neodymium catalyst having a second polydispersity greater than the first polydispersity and a second solution viscosity to Mooney Viscosity ratio less than the first solution viscosity to Mooney Viscosity ratio. In one embodiment, the second solution viscosity to Mooney Viscosity ratio may range from about 2 to about 4. In another embodiment, the first solution viscosity to Mooney Viscosity ratio ranges from about 5 to about 12.

In this aspect of the invention, the cover may also include a thermoset material. In another embodiment, the ball may include an intermediate layer formed from a thermoplastic material. In yet another embodiment, the ratio of weight percentage of the branched polybutadiene to the linear polybutadiene is at least about 60:40.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
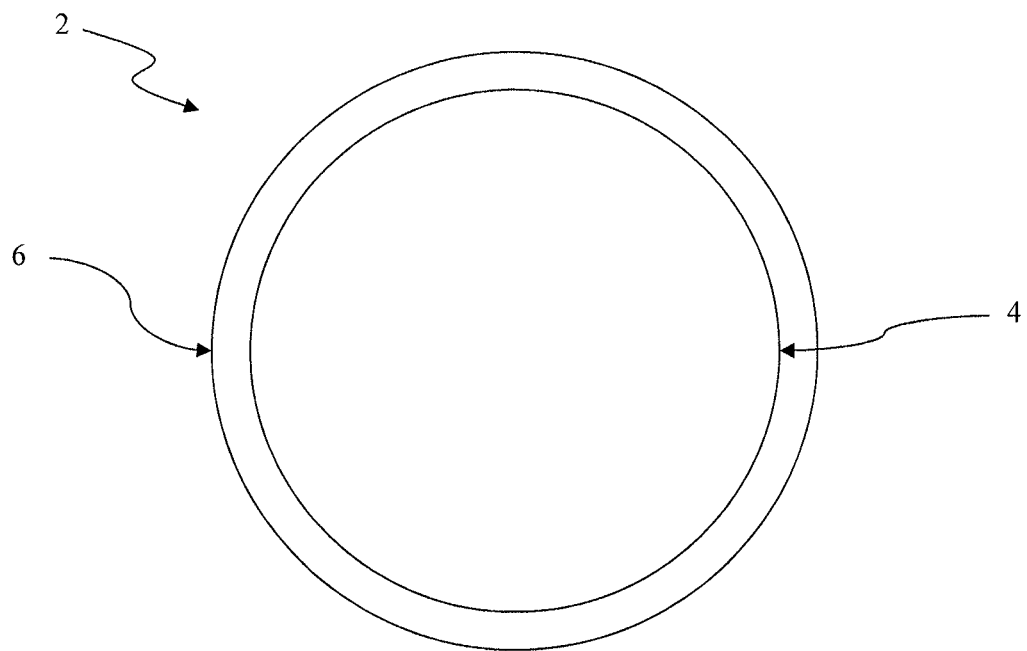
FIG. 1 is a cross-sectional view of a two-piece golf ball having a cover and a core according to the invention.

As used herein, the term "about" is used in connection with one or more numbers or numerical ranges, should be understood to refer to all such numbers, including all numbers in a range.

The present invention is directed toward blends of branched Nd-BR and linear Nd-BR that may be used in golf ball components. A variety of golf ball constructions, i.e., one-piece, two-piece, or multilayer balls, are possible for use in the present invention. As used herein, the term "multi-layer" refers to golf balls having at least two layers, which includes wound balls and balls with multiple core, intermediate, and cover layers.

The compositions of the invention include a blend of two or more polybutadiene rubber ("BR") components, both formed with a lanthanide series catalyst. In particular, a neodymium ("Nd") catalyst is a preferred lanthanide series catalyst for both polybutadienes. For example, the blend may include a long-chain branched polybutadiene rubber formed with a neodymium catalyst ("branched Nd-BR") and a linear polybutadiene rubber formed with a neodymium catalyst ("linear Nd-BR"). Both the linear and branched Nd-BR rubbers preferably have a cis-1,4 content of at least about 95 percent. In one embodiment, at least one of the linear and branched Nd-BR rubbers has a cis-1,4 content of at least about 96 percent. In still another embodiment, at least one of the linear and branched Nd-BR rubbers has a cis-1,4 content of at least about 98 percent. The blend may optionally contain cobalt, lithium, titanium, or nickel catalyzed polybutadienes.

As will be understood by those skilled in the art, polymers such as polybutadiene may be characterized according to various definitions of molecular weight. In this regard, the branched Nd-BR may have a weight average molecular weight ($M_w$) that ranges from about 200,000 to about 600,000. In one embodiment, the $M_w$ of the branched Nd-BR ranges from about 250,000 to about 450,000. In another embodiment, the branched Nd-BR ranges from about 300,000 to about 400,000. The number average molecular weight ($M_n$) of the branched Nd-BR may range from about 50,000 to about 400,000, preferably about 80,000 to about 300,000, and more preferably about 85,000 to about 200,000.

A common indicator of the degree of molecular weight distribution of a polymer is its polydispersity, defined as the ratio of weight average molecular weight ($M_w$) to number average molecular weight ($M_n$). Polydispersity also provides an indication of the extent to which the polymer chains share the same degree of polymerization. If the polydispersity is 1.0, then all polymer chains must have the same degree of polymerization. Since $M_w$ is always equal to or greater than $M_n$, polydispersity, by definition, is equal to or greater than 1.0. Linear polymers tend to have a polydispersity that is close to 1.0. In contrast, a branched polymer may have a polydispersity that is much greater than 1.

For example, the polydispersity of the linear Nd-BR may be less than about 3. In one embodiment, the linear Nd-BR has a polydispersity of about 1.5 to about 2.8. In another embodiment, polydispersity of the linear Nd-BR ranges from about 1.7 to about 2.5. In still another embodiment, the polydispersity of the linear Nd-BR ranges from about 1.8 to about 2.3. In contrast, the polydispersity of the branched Nd-BR may be greater than about 2. In one embodiment, the polydispersity of the branched Nd-BR is greater than about 3. In another embodiment, the branched Nd-BR has a polydispersity of about 3.5 or greater, preferably about 3.5 or greater. In still another embodiment, the branched Nd-BR has a polydispersity of about 4 or greater, preferably about 4.25 or greater. In another embodiment, the polydispersity of the branched Nd-BR is greater than about 5.

Without being bound to any particular theory, it is believed that a wide polydispersity generally results in a low resilience. As discussed above, a convenient method for expressing the resilience of a polymer is through Coefficient of Restitution ("COR"). The Nd-BR blends of the present invention result in a golf ball component with a COR value of greater than about 0.78. Preferably, the COR of the golf ball component is greater than about 0.79. In one embodiment, golf ball component has a COR of about 0.8 or greater.

As discussed above, Mooney viscosity is related to the molecular weight of a polymer. For example, as the molecular weight increases, the Mooney viscosity increases. The measurement of Mooney viscosity is defined according to ASTM D-1646. The polybutadienes of the present invention preferably have a Mooney viscosity that is less than about 100. In one embodiment, the linear Nd-BR has a Mooney viscosity between about 30 and about 100. Preferably, the linear Nd-BR has a Mooney viscosity between about 40 and about 80. More preferably, the Mooney viscosity for the linear Nd-BR is between about 45 and about 60. The branched Nd-BR preferably has a lower Mooney viscosity than the linear polybutadiene. In one embodiment, the branched Nd-BR has a Mooney viscosity between about 20 and about 90. Preferably the branched Nd-BR has a Mooney viscosity between about 30 and about 75. More preferably, the branched Nd-BR has a Mooney viscosity between about 35 and about 50. For example, the branched Nd-BR may have a Mooney viscosity between about 40 and about 45. In an exemplary embodiment, the branched Nd-BR has a Mooney viscosity of about 44.

The polybutadienes of the present invention are also definable by their respective solution viscosity (SV) values. In one embodiment, the branched Nd-BR of the present invention has a solution viscosity of from about 155 to about 170. In another embodiment, the branched Nd-BR has a solution viscosity of from about 159 to about 165.

As would be understood by those skilled in the art, polymers with a high solution viscosity (SV) with respect to the Mooney viscosity (MV) experience cold flow problems and suffer a disadvantage in processability. Therefore, it may be desirable from a processing standpoint to reduce the ratio of solution viscosity to Mooney viscosity (SV/MV). Linear polymers may have a high SV/MV ratio, which as mentioned above, may contribute to processing problems. For example, the linear Nd-BR may have a solution viscosity to Mooney viscosity ratio of between about 5 and about 15. In one embodiment, the SV/MV ratio for the linear Nd-BR is between about 5 and about 12. In another embodiment, the linear Nd-BR has a SV/MV ratio that ranges from about 5 to about 10. In still another embodiment, the SV/MV ratio of the linear Nd-BR ranges from about 5 to about 7.

By contrast, the branched Nd-BR may have a SV/MV that is about 4 or less. In one embodiment, the SV/MV ratio of the branched Nd-BR is less than about 4. For example, the branched Nd-BR may have a SV/MV ratio that is about 3.8 or less, 3.75 or less, or about 3.6 or less. In one embodiment, the SV/MV ratio ranges from about 3.6 to about 3.8. In another embodiment, the SV/MV ratio is about 3.5 or less. In still another embodiment, the SV/MV ratio of the branched Nd-BR may be about 3 or less. In another embodiment, the SV/MV ratio for the branched Nd-BR ranges from about 1.8 to about 4, preferably about 2 to about 4. In yet another embodiment, the branched Nd-BR may have a SV/MV ratio from about 3.6 to about 3.75, preferably from about 3.6 to about 3.65.

In particular, as shown in Table 1 below, both the linear and branched Nd-BR that are included in the blends of the present invention have SV/MV ratio values that are greater than the SV/MV ratio of a branched cobalt catalyzed polybutadiene.

TABLE I

|  | SV/MV |
|---|---|
| Branched Co-BR | 1.3 |
|  | 1.4 |
|  | 1.7 |
| Linear Nd-BR | 5.9 |
|  | 6.3 |
|  | 6.6 |
| Branched Nd-BR | 2.1 |
|  | 3.2 |
|  | 3.6 |
|  | 3.63 |
|  | 3.75 |
|  | 3.8 |

As shown in Table I, branched Nd-BR has a SV/MV ratio that is lower than linear Nd-BR. However, as discussed above, since linear Nd-BR has a relatively lower polydispersity than branched Nd-BR, blends of branched and linear Nd-BR offer the processability of branched Nd-BR combined with the resilience of linear Nd-BR.

In one embodiment, the SV/MV ratio of the linear Nd-BR is at least about 2 times greater than the SV/MV ratio of the branched Nd-BR. In another embodiment, the SV/MV ratio of the linear Nd-BR is at least about 2.5 times greater than the SV/MV ratio of the branched Nd-BR. In yet another embodiment, the SV/MV ratio of the linear Nd-BR is at least about 3 times greater than the SV/MV ratio of the branched Nd-BR.

Another method of determining the processability of a polymer is to measure the Mooney Stress Relaxation (MSR). A high MSR may result in processing problems, such as die swell and extrudate or calendered sheet shrinkage. The MSR of the linear Nd-BR may range from about 0.45 to about 0.75, preferably about 0.50 to about 0.70. The MSR of the branched Nd-BR may range from about 0.45 to about 0.75, preferably about 0.45 to about 0.70. Table II demonstrates the MSR values for several linear Nd-BR and branched Nd-BR samples, as well as for branched Co-BR.

TABLE II

|  | MSR |
|---|---|
| Branched Co-BR | 0.34 |
|  | 0.37 |
|  | 0.41 |
| Linear Nd-BR | 0.50 |
|  | 0.57 |
|  | 0.69 |
| Branched Nd-BR | 0.46 |
|  | 0.50 |
|  | 0.68 |

As shown in the data above, the linear Nd-BR has a higher MSR than the branched Nd-BR, but both have a higher MSR than the short-chain branched cobalt grades that are currently used in blends with linear neodymium-catalyzed polybutadienes. In this respect, the blends of the invention are believed to achieve a better balance of resilience, millability, ease of extrusion, and resistance to cold flow than conventional blends of linear polybutadiene and short-chain branched cobalt-catalyzed polybutadiene.

In one embodiment, the ratio of MSR of the linear Nd-BR to the branched Nd-BR is greater than 1.0. For example, the ratio of the linear Nd-BR MSR to the branched Nd-BR MSR ranges from about 1.0 to about 1.2. In another embodiment, the ratio of the linear Nd-BR MSR to the branched Nd-BR MSR ranges from about 1.01 to about 1.15.

According to one aspect of the present invention, the ratio of weight percentage in the blend of the branched Nd-BR to linear Nd-BR is preferably at least about 51:49, more preferably at least about 60:40, and most preferably at least about 75:25.

In an alternative embodiment, the blend includes more linear Nd-BR and less branched Nd-BR. In one embodiment, the linear Nd-BR to branched Nd-BR ratio of weight percentage is preferably at least about 51:49, more preferably at least about 60:40, and most preferably at least about 75:25. In another embodiment, the linear Nd-BR to branched Nd-BR ratio of weight percentage is about 80:20, more preferably 90:10, and most preferably 95:5.

Methods for the preparation of a linear Nd-BR are known in the art and described in U.S. Pat. No. 6,774,187, which is incorporated by reference in its entirety. In particular, a polybutadiene rubber that is catalyzed with lanthanide series catalysts may be prepared by polymerizing butadiene monomer in the presence of catalysts comprising a lanthanide series element and compound, an organoaluminum compound, a Lewis base, and optionally, a Lewis acid. In this regard, it is preferable that the lanthanide element is neodymium. The Lewis bases serve to convert the lanthanide element into complexes, and acetylacetone and ketone alcohols and the like may be used for this purpose. In the synthesis of Nd-BR, the Nd catalysts may be used as solution in a suitable solvent such as n-hexane, cyclohexane, n-heptane, toluene, xylene, benzene, etc. or carried on suitable carriers such as silica, magnesia, and magnesium chloride. The polymerization temperature typically ranges from about −30° C. to about 150° C., preferably from about 10° C. to about 80° C. The polymerization pressure may vary depending on other conditions. Examples of commercially available Nd-BR for use in the preparation of the linear Nd-BR include, but are not limited to, Buna® CB21, CB22 and CB23, available from Lanxess Corporation, Neodene 40 and Neodene 45, available from Karbochem, and BR51, T700 and BR730, available from JSR Corporation.

Without being bound to any particular theory, a long-chain branched Nd-BR may be produced through a "Mooney Jump Reaction", also known as a "molecular weight jumping" reaction. A "Mooney Jump Reaction" is a well-known process for increasing the degree of branching of a polymer, which results in an increase in molecular weight. A non-limiting example of a "Mooney Jump Reaction" is depicted below.

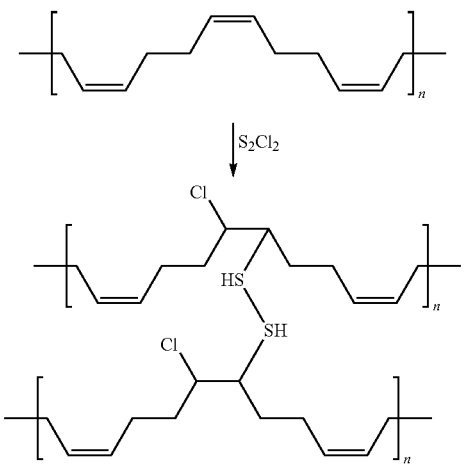

One non-limiting example of a commercially available branched Nd-Br suitable for use in the present invention is Buna® CB25, which is available from Lanxess Corporation. Other non-limiting examples of commercially available branched Nd-Br suitable for use in the present invention include Buna® CB24-Orange, Buna® CB24-Dormagen, and Buna® CB 728T, which are also available from Lanxess Corporation. In this aspect, suitable branched Nd-Br for use in the present invention include those having a high cis-1,4 content, e.g., at least 96 percent.

In addition to the previously discussed components of the blends of the present invention, the compositions of the invention may include other species of butadiene rubber, as well as natural rubber, balata, gutta-percha, synthetic polyisoprene, styrene-butadiene rubber, styrene-propylene-diene rubber, chloroprene rubber, acrylonitrile rubber, acrylonitrile-butadiene rubber, ethylene-propylene rubber, ethylene-propylene-diene terpolymer, and mixtures thereof. For example, the blends of the present invention may also include styrene-butadiene rubber (SBR) in an amount of about 1 to about 30 parts per hundred. In one embodiment, the blends of the invention include about 5 to about 20 parts per hundred of SBR. Similarly, the blends of the invention may also include about 1 to about 30 parts per hundred of natural rubber (NR), polyisoprene rubber (PIP), butyl rubber, or mixtures thereof. In one embodiment, the blends of the invention also include about 5 to about 20 parts per hundred NR, PIP, butyl rubber, or combinations thereof.

In addition, the COR of the golf ball component formed from the compositions of the invention may be reduced by the addition of certain types of rubber to the blend. For example, styrene-butadiene rubber, natural rubber, polyisoprene, butyl or halogenated butyl rubber, lower cis-content butadiene rubber, high-trans or high-vinyl content butadiene rubber, and similar rubbers may be added to the mixture as needed to adjust the COR.

Cross-Linking Agent

One conventional adduct to the blend is a reactive co-agent that crosslinks (i.e., vulcanizes) the rubber. To prevent water absorption to the core and enhance the durability of the golf ball, the amount of co-agent is minimized to preferably less than about 10 parts per hundred ("phr") by weight of the blend, more preferably less than about 5 phr, and most preferably about 0 phr (no co-agent).

Alternatively, a moderately hard component may be achieved using the co-agent in an amount between about 10 phr and about 50 phr by weight of the BR blend. Furthermore, the core may be very hard and dense when at least about 50 phr of the co-agent is incorporated into the core. The co-agent is preferably a salt of an unsaturated carboxylic acid having about 3 to 8 carbon atoms; an unsaturated vinyl compound; a polyfunctional monomer; phenylene bismaleimide; or a mixture thereof.

In one aspect of the invention, the blends also incorporate at least one reactive co-agent to enhance the hardness. A suitable co-agent for use in this aspect may be formed from an unsaturated carboxylic acid, preferably an α,β-ethylenically unsaturated carboxylic acid having about 3 to 8 carbon atoms, such as methacrylic, acrylic, itaconic, sorbic, cinnamic and crotonic acid. Suitable counterions include, but are not limited to, quaternary phosphonium or ammonium cations such as tetraalkyl phosphonium, and metal cations such as sodium, lithium, potassium, magnesium, calcium, zinc, barium, aluminum, tin, zirconium, nickel and cadmium. Zinc, magnesium and cadmium are preferred as the metal cations.

Other co-agents may comprise unsaturated vinyl compounds including without limitation N,N'-m-phenylene dimaleimide (available as Vanax® MBM from R. T. Vanderbilt); trimethylolpropane trimethacrylate (Sartomer® SR-350 from Sartomer); triallyl trimellitate (Triam® 705 from Wako Chemicals); triallylisocyanurate (Taic® from Nippon Kasei Chemical); acrylate-terminated liquid polybutadiene (PolyBD® 300 from Elf Atochem N.A.); and mixtures thereof. In addition, poly-functional monomers, phenylene bismaleimide and sulfur may also be used as the co-agent.

In one embodiment, the co-agent is a mono-(meth)acrylic acid or di-(meth)acrylic acid metal salt, wherein the cation is zinc, magnesium, calcium, or mixtures thereof. As used herein, the term "(meth)acrylic" includes both methacrylic and acrylic. For example, the co-agent may be zinc diacrylate ("ZDA"), zinc dimethacrylate ("ZDMA"), or mixtures thereof. Of the common acrylate cross-linkers, ZDA has generally been found to produce golf balls with greater initial velocity than ZDMA, therefore, the former may be preferable to achieve a specific initial velocity. The ZDA can be of various grades of purity. For the purposes of this invention, the lower the quantity of zinc stearate present in the ZDA the higher the ZDA purity. Thus, ZDA containing less than about 10 percent zinc stearate is preferable. In one embodiment, ZDA containing between about 4 percent and about 8 percent zinc stearate is employed. The co-agent may be present in an amount from about 0 to about 50 phr by weight of the blend.

Free Radical Source(s)

Conventionally, a free radical initiator is used to promote the crosslink reaction between the reactive co-agent and the polybutadiene rubber. The free radical initiators included in the core compositions herein may be any known polymerization initiators that produce free radicals during the curing cycle. Suitable initiators include peroxides, persulfates, azo compounds and hydrazides.

Examples of the peroxides for the purposes of the present invention include dicumyl peroxide; n-butyl-4,4-di(t-butylperoxy)-valerate; 1,1-bis(t-butylperoxy)-3,3,5-trimethylcyclohexane; α,α'-bis(t-butylperoxy)-diisopropylbenzene; 2,5-dimethyl-2,5-di(t-butylperoxy)hexane; di-t-butyl peroxide; di-t-amyl peroxide; di(2-t-butyl-peroxyisopropyl)benzene peroxide; lauryl peroxide; benzoyl peroxide; t-butyl hydroperoxide; and mixtures thereof.

Preferably, the peroxide initiator is dicumyl peroxide having an activity between about 40 percent and about 100 percent. The initiator may be present in the blend in an amount ranging between about 0.05 phr and about 15 phr by weight of the blend. For example, in one embodiment, the amount of the initiator ranges between about 0.1 phr and about 5 phr, and most preferably between about 0.25 and about 1.5 phr. Those of ordinary skill in the art will understand that the total amount of initiators used will vary depending on the specific end product desired and the particular initiators employed.

Alternatively, sulfur-based curing agents with optional accelerators may be used in combination with or in replacement of the peroxide initiators to crosslink the BR, as described in U.S. Pat. No. 6,695,718, the disclosure of which is incorporated herein by reference in its entirety. Other useful initiators will be readily apparent to one of ordinary skill in the art. The initiator may alternatively or additionally be one or more of electron beams; gamma radiation; infrared radiation; ultra-violet radiation; X-ray radiation; or any other high-energy radiation source capable of generating free radicals. It should be further understood that heat often facilitates initiation of the generation of free radicals.

Filler(s)

Fillers may be added to one or more portions of the golf ball. In one embodiment, at least one filler is added to the blend. Fillers typically include processing aids or compounds to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

Fillers may also include various foaming agents or blowing agents which may be readily selected by one of ordinary skill in the art. Foamed polymer blends may be formed by blending blowing agent(s) with polymer material, as is well known by those of ordinary skill in the art. Polymeric, ceramic, metal, or glass microspheres, or combinations thereof, may be used to adjust the density or other properties of a given layer, and such microspheres may be solid or hollow, and filled or unfilled. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The compositions of the present invention may additionally comprise any other suitable and compatible modifying ingredients including, but not limited to, metal oxides, fatty acids, and diisocyanates. For example, metal oxides such as zinc oxide and/or magnesium oxide may be added as activators for the BR. Fatty acids or metallic salts of fatty acids such as stearic, palmitic, oleic and linoleic acids may be included as moldability and processing additives. Polymeric diisocyanates such as 4,4'-diphenylmethane diisocyanate and other polyfunctional isocyanates may also be incorporated in the rubber compositions as moisture scavengers.

Other additives suitable for the core compositions, including stable free radicals; free radical scavengers; scorch retarders; cis-to-trans catalysts; density fillers; nanofillers; dispersing agents; foaming agents; antioxidants; chain-transfer agents; stabilizers; processing aids; processing oils; plasticizers; dyes and pigments; as well as other additives well known to the skilled artisan, may also be used in the present invention in amounts sufficient to achieve the purpose for which they are typically used.

Antioxidant

The rubber composition optionally contains one or more antioxidants. Antioxidants are compounds that can inhibit or prevent the oxidative degradation of the rubber. Some antioxidants also act as free radical scavengers; thus, when antioxidants are included in the rubber composition, the amount of initiator agent used may be as high or higher than the amounts disclosed herein. Suitable antioxidants include, for example, dihydroquinoline antioxidants, amine type antioxidants, and phenolic type antioxidants.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the compositions of the invention may be used in a core, an intermediate layer, and/or a cover of a golf ball, each of which may have a single layer or multiple layers. In one embodiment, the compositions of the invention are formed into a core layer.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multilayer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Figure 2:
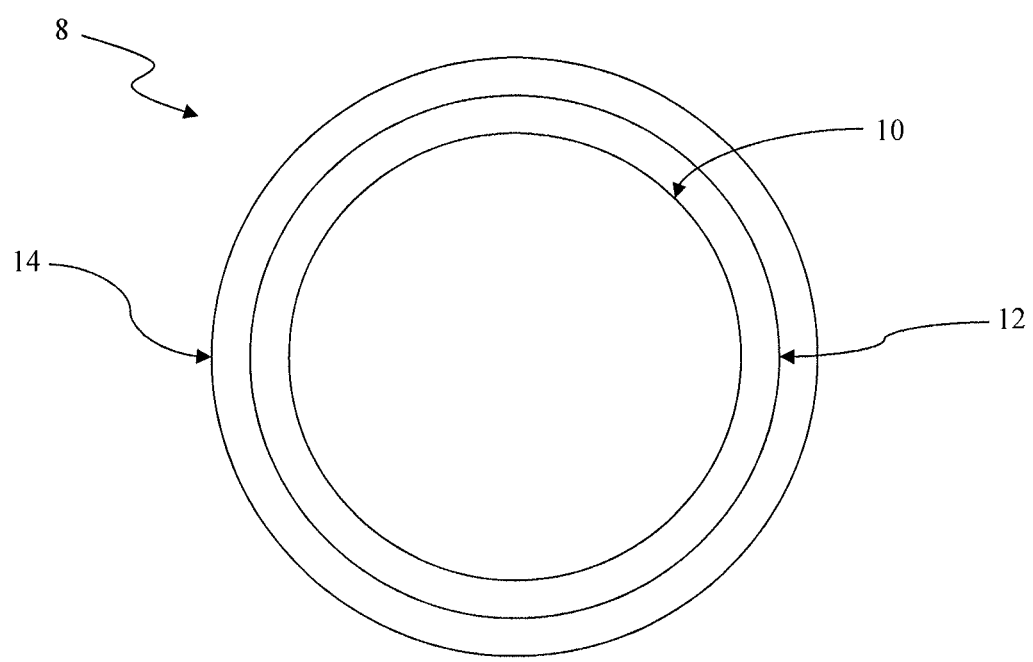
FIG. 2 is a cross-section of a golf ball having an intermediate layer between a cover and a center according to the invention.
Figure 3:
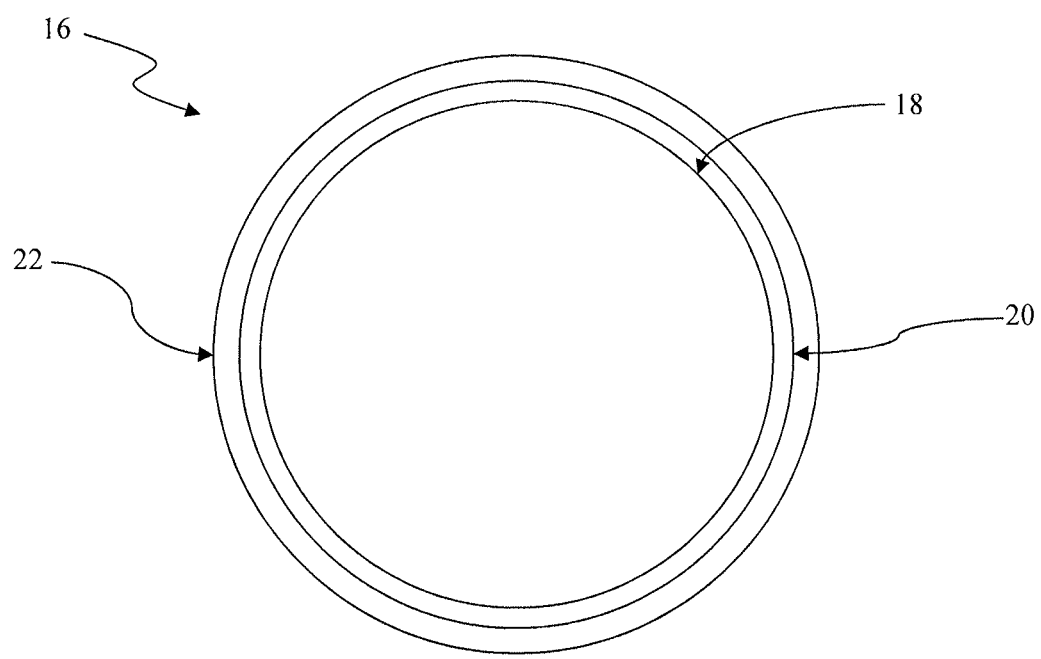
FIG. 3 is a cross-section of a golf ball having a large core and a dual cover layer according to the invention.

Referring to FIG. 1, a golf ball 2 of the present invention can include a center 4 and a cover 6 surrounding the center 4. Referring to FIG. 2, a golf ball 8 of the present invention can include a center 10, a cover 14, and at least one intermediate layer 12 disposed between the cover and the center. In one embodiment, the cores 4 and/or 14 may be formed from the composition of the invention. Each of the layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer. The core 18 may be formed from the composition of the invention. In one embodiment, the cover 22 is formed from a polyurethane or polyurea material.

Golf Ball Core Layer(s)

The core or core layer(s) may be formed from the compositions of the invention. For example, a core formed from the composition of the invention may be covered with a castable thermoset or injection moldable thermoplastic material or any of the other cover materials discussed below. The core may have a diameter of about 1.5 inches to about 1.62 inches and the cover layer thickness may range from about 0.03 inches to about 0.06 inches. The core compression preferably ranges from about 30 to about 120 atti and the overall ball compression is about 50 to about 110. In one embodiment, the PGA compression of a core formed from the composition of the invention is about 5 PGA to about 40 PGA. In another embodiment, the core has a PGA compression value of about 10 to about 40, preferably about 15 to about 20. The overall ball has a PGA compression value of about 20 to about 80, preferably about 25 to about 65, and more preferably about 30 to about 45. For example, the overall ball may have a PGA compression of about 30 to about 35. In one embodiment, the PGA compression of the overall ball is about 35 to about 45. In another embodiment, the PGA compression of the overall ball is about 35 to about 40.

When not formed from the compositions of the invention, any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

Golf Ball Intermediate Layer(s)

An intermediate layer, such as an outer core layer or inner cover layer, i.e., any layer(s) disposed between the inner core and the outer cover of a golf ball may be formed from the compositions of the current invention. Such an intermediate layer may be distinguished from a core or a cover by some difference between the golf ball layers, e.g., hardness, compression, thickness, etc. An intermediate layer may be used, if desired, with a multilayer cover or a multilayer core, or with both a multilayer cover and a multilayer core. As with the core, the intermediate layer may also include a plurality of layers.

In one embodiment, the intermediate layer is formed, at least in part from the compositions of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

In another embodiment, the intermediate layer is covered by an inner cover layer, either of which may independently be formed from the compositions of the invention or other material that produces the desired performance results. For example, a ball of the invention may include a center having a diameter of about 0.5 inches to about 1.30 inches and a compression of about 30 to about 110 atti, preferably about 50 to about 100 atti. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly (ether-amide), such as PEBAX, sold by Arkema, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high moisture resistance, high abrasion resistance, high impact resistance, high tear strength, high resilience, and good mold release, among others. The cover layer may be formed, at least in part, from a composition of the invention. However, when not formed from the compositions of the invention, the cover may be formed from one or more homopolymeric or copolymeric materials as discussed in the section above pertaining to the intermediate layer. Golf balls according to the invention may also be formed having a cover of polyurethane, polyurea, and polybutadiene materials discussed in U.S. Pat. No. 6,835,794.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Any of the golf ball layers may be surface treated by conventional methods including blasting, mechanical abrasion, corona discharge, plasma treatment, and the like, and combinations thereof. In fact, because low surface energy, or surface tension, is a key feature of polysiloxanes, layers formed from the compositions of the invention may be surface treated according to U.S. Patent Publication No. 2003/0199337, the disclosure of which is incorporated in its entirety by reference herein.

Golf Ball Properties

Properties such as core diameter, intermediate layer and cover layer thickness, hardness, and compression can also be altered to affect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

Solid sphere cores formed of the compositions of the invention preferably have a surface hardness of about 20 to 65 Shore D, preferably greater than about 30 Shore D, and even more preferably greater than about 40 Shore D. For example, in one embodiment, a solid sphere formed of the composition of the invention has a surface hardness ranging from about 52 to about 65 Shore D.

As such, if additional golf ball layers are formed of the compositions, they also preferably have hardnesses in this range. For example, a golf ball layer formed of the composition of the invention may have a hardness greater than about 55 Shore D. In one embodiment, the hardness is about 60 Shore D or greater. In another embodiment, additional golf ball layers are formed of alternative compositions with hardness ranges from about 35 Shore D to about 50 Shore D, preferably from about 40 Shore D to about 50 Shore D. Because the compositions of the invention may be used in any layer of a golf ball, the golf ball construction, physical properties, and resulting performance may vary greatly depending on the layer(s) of the ball that include the compositions of the invention.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the compositions of the invention, the hardness of the intermediate layer may be about 55 Shore D or greater, preferably ranging from about 55 Shore D to about 65 Shore D. In yet another embodiment, the hardness of the intermediate layer is about 50 Shore D or less, preferably from about 35 Shore D to about 55 Shore D. The intermediate layer may also be about 65 Shore D or greater. For example, a golf ball of the invention may include an inner cover formed from an ionomer having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression is an important factor in golf ball design. For example, the compression of the core can affect the ball's spin rate off the driver and the feel. In fact, the compositions and methods of the present invention result in a rigid inner ball that ultimately results in an overall harder ball. The harder the overall ball, the less deformed it becomes upon striking, and the faster it breaks away from the golf club.

As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

The Atti compression of the core, or portion of the core, of golf balls prepared according to the invention may range from about 60 to about 120 atti, preferably about 65 to about 115 atti, and most preferably 70 to 110 atti. In one embodiment, the core compression is less than about 80, preferably less than about 75.

Coefficient of Restitution

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.790, preferably at least about 0.800. For example, the COR of solid spheres formed from the compositions of the invention ranges from about 0.810 to about 0.830. In one embodiment, a solid sphere formed from the composition of the invention has a COR of about 0.800 to about 0.825. In another embodiment, the COR of the solid sphere ranges from about 0.805 to about 0.815.

EXAMPLES

The following non-limiting examples are merely illustrative of the preferred embodiments of the present invention, and are not to be construed as limiting the invention, the scope of which is defined by the appended claims.

Example 1

A golf ball according to the invention may be formed with a core or inner layer that is formed from a composition that includes a blend of a linear Nd-BR having a SV/MV ratio of about 5.5 to about 7.0 and a branched Nd-BR having a SV/MV ratio of about 2.0 to about 4.0. The inner ball may be covered with a cover formed from a thermoplastic or thermoset material.

Example 2

A golf ball according to the invention may be formed with a core that is formed from a composition that includes a blend of a linear Nd-BR having a SV/MV ratio of about 5.5 to about 7.0 and a branched Nd-BR having a SV/MV ratio of about 3.6 to about 3.8. The SV may range from about 159 to about 165 and the MV may be about 44. The inner ball may be covered with a cover formed from a thermoplastic or thermoset material.

Example 3

A golf ball according to the invention may be formed with a core that is formed from a composition that includes a blend of a linear Nd-BR having a SV/MV ratio of about 5.9 to about 6.6 and a branched Nd-BR having a MV of 44, a SV of 159, and a SV/MV ratio of 3.6.

Example 4

A golf ball according to the invention may be formed with a core that is formed from a composition that includes a blend of a linear Nd-BR having a SV/MV ratio of about 5.9 to about 6.6 and a branched Nd-BR having a MV of 44, a SV of 165, and a SV/MV ratio of 3.8.

Example 5

A golf ball according to the invention may be formed with a core that is formed from a composition that includes a blend of a linear Nd-BR having a SV/MV ratio of about 5.9 to about 6.6 and a branched Nd-BR having a MV of 44, a SV of 160, and a SV/MV ratio of 3.6.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein the core is formed from a blend comprising:
   a linear polybutadiene formed with a neodymium catalyst having a first polydispersity and a first Mooney viscosity of from about 30 to about 100; and
   a branched polybutadiene formed with a neodymium catalyst having a second polydispersity greater than the first polydispersity and a second Mooney viscosity of from about 30 to about 75, wherein the second Mooney viscosity is less than the first Mooney viscosity.

2. The golf ball of claim 1, wherein the linear polybutadiene has a higher Mooney Stress Relaxation than the branched polybutadiene.

3. The golf ball of claim 1, wherein the second Mooney viscosity is of from about 35 to about 50.

4. The golf ball of claim 3, wherein the second Mooney viscosity is about 40 to about 45.

5. The golf ball of claim 1, wherein the branched polybutadiene has a solution viscosity to Mooney Viscosity ratio of about 3.0 to about 4.0.

6. The golf ball of claim 5, wherein the branched polybutadiene has a solution viscosity to Mooney Viscosity ratio of about 3.6 to about 3.8.

7. The golf ball of claim 1, wherein the linear polybutadiene has a solution viscosity to Mooney Viscosity ratio of greater than about 5.

8. The golf ball of claim 1, wherein the solution viscosity to Mooney Viscosity ratio of the linear polybutadiene is at least about 2 times greater than the solution viscosity to Mooney Viscosity ratio of the branched polybutadiene.

9. The golf ball of claim 1, further comprising an intermediate layer disposed between the cover and the core.

10. The golf ball of claim 1, wherein the blend further comprises cobalt-, lithium-, titanium-, or nickel-catalyzed polybutadienes.

11. A golf ball comprising a core, a cover, and an intermediate layer disposed between the cover and the core, wherein a portion of the golf ball is formed from a blend comprising:
   a linear polybutadiene formed with a neodymium catalyst having a first polydispersity and a first Mooney viscosity; and
   a branched polybutadiene formed with a neodymium catalyst having a second polydispersity greater than the first polydispersity and a second Mooney viscosity less than the first Mooney viscosity, wherein the second polydispersity is greater than about 2, and wherein the second Mooney viscosity is of from about 35 to about 50.

12. The golf ball of claim 11, wherein the linear polybutadiene has a first Mooney Stress Relaxation and the branched polybutadiene has a second Mooney Stress Relaxation, and wherein the second Mooney Stress Relaxation is less than the first Mooney Stress Relaxation.

13. The golf ball of claim 11, wherein the first polydispersity is less than about 3.

14. The golf ball of claim 11, wherein the first Mooney viscosity is of from about 30 to about 100.

15. The golf ball of claim 11, wherein the core comprises a center and at least one outer core layer, and wherein at least one of the center or the outer core comprises the blend.

16. The golf ball of claim 11, wherein the cover comprises polyurethane, polyurea, or a combination thereof.

17. A golf ball comprising a core and a cover, wherein the core comprises a blend comprising:
   a linear polybutadiene formed with a neodymium catalyst having a first polydispersity and a first solution viscosity to Mooney Viscosity ratio; and
   a branched polybutadiene formed with a neodymium catalyst having a second polydispersity greater than the first polydispersity and a second solution viscosity to Mooney Viscosity ratio less than the first solution viscosity to Mooney Viscosity ratio, and wherein the second solution viscosity to Mooney Viscosity ratio ranges from about 3 to about 4 and the first solution viscosity to Mooney Viscosity ratio ranges from about 5 to about 12.

18. The golf ball of claim 17, wherein the cover comprises a thermoset material.

19. The golf ball of claim 17, further comprising an intermediate layer formed from a thermoplastic material.

20. The golf ball of claim 17, wherein the ratio of weight percentage of the branched polybutadiene to the linear polybutadiene is at least about 60:40.

* * * * *